Jan. 8, 1963

P. F. HURT 3,071,975

ACCELEROMETER

Filed Feb. 27, 1961

Percy F. Hurt,
*INVENTOR.*

BY S. J. Rotondi
A. T. Dupont
Jack W. Voigt

Jan. 8, 1963

P. F. HURT 3,071,975

ACCELEROMETER

Filed Feb. 27, 1961

Percy F. Hurt,
INVENTOR.

BY S. J. Rotondi
A. L. Dupont
Jack W. Voigt

Jan. 8, 1963    P. F. HURT    3,071,975
ACCELEROMETER

Filed Feb. 27, 1961    3 Sheets-Sheet 3

Percy F. Hurt,
INVENTOR.

BY S. J. Rotondi
A. L. Dupont
Jack W. Voigt

United States Patent Office 3,071,975
Patented Jan. 8, 1963

3,071,975
ACCELEROMETER
Percy F. Hurt, 2720 Nela Ave., Orlando, Fla.
Filed Feb. 27, 1961, Ser. No. 92,107
9 Claims. (Cl. 73—517)
(Granted under Title 35, U.S. Code (1952), sec. 266)

The invention described herein may be manufactured and used by or for the Government for governmental purposes without the payment of any royalty thereon.

The invention relates to an accelerometer. Such an accelerometer provides means for detecting and measuring the amount and direction of the acceleration of a moving vehicle on which the accelerometer is referenced. The accelerometer is useful with any vehicle which is subject to acceleration or vibration. More particularly, the accelerometer is useful in the guided missile field where two or three, depending on their location, of the accelerometers can be used to replace the missile's stabilized platform.

In view of these facts, an object of this invention is to provide an accelerometer which is accurate enough and capable of replacing a missile's stabilized platform when joined with at least one other accelerometer of the same type.

Another object of this invention is to provide an accelerometer which will indicate any acceleration applied to a vehicle, on which the accelerometer is fixed, by producing an output voltage.

Still another object of the invention is to provide an acceleration responsive device provided with an element mounted for rotation, which is responsive to radial forces.

A further object of the invention is to provide an accelerometer which will provide an indication of the direction of any acceleration applied to a vehicle on which the accelerometer is fixed.

A further object of the invention is to provide an accelerometer which contains a force sensitive device which is subjected to an acceleration force created within the accelerometer by rotating the force sensitive device, as well as acceleration forces created by means external to the accelerometer.

A still further object of this invention is to provide an accelerometer which is of relatively simple construction.

The foregoing and other objects of this invention will become more fully apparent from the following detailed description of the invention and from the accompanying drawings, in which.

Figure 1:
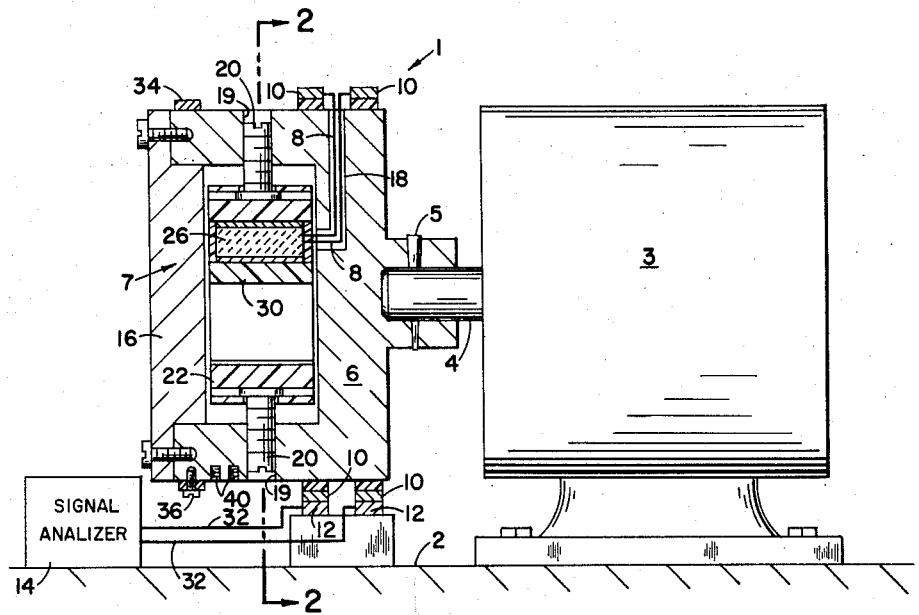
FIGURE 1 is an elevational view, partly in section, of the accelerometer.
Figure 2:
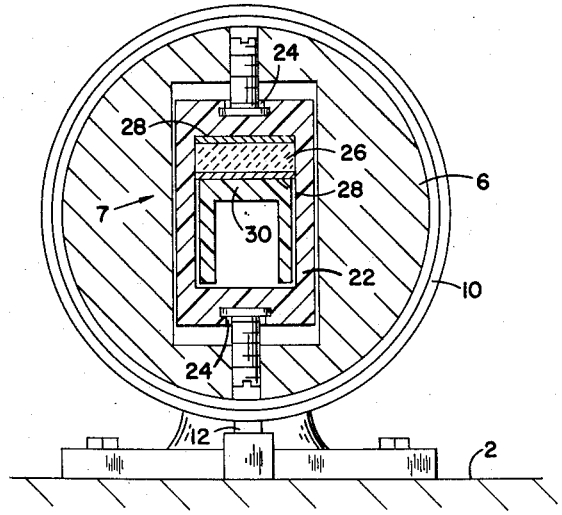
FIGURE 2 is a view along line 2—2 of FIGURE 1.

In the drawings, wherein for the purpose of illustration the invention is shown, the numeral 1 designates an accelerometer comprising a mounting platform 2, a motor 3 having a rotatable shaft 4 extending externally of the motor housing, mounted on the platform, a partially hollow disc 6 connected to shaft 4, by any suitable means such as pin 5, a radial force sensitive device 7 secured in the hollow portion of the disc, electrical conductors 8 connecting device 7 to the outer surface of said disc, electrical contacts 10 coacting with said conductors, and a second set of electrical contacts 12 connecting said contacts to a signal analyzer 14.

Partially hollow disc 6 is provided with a removable end plate 16, opposite from motor 3. This plate provides access to the radial force sensitive device. The disc is also provided with an aperture 18 for housing conductors 8, and a pair of threaded bores 19 which will be discussed later.

In order to provide the space necessary for allowing adjustment of the location of the radial force sensitive device, the device is made smaller in size than the hollow portion of disc 6. Device 7 is maintained in the hollow space by a pair of adjusting screws 20, which are adapted to coact with threaded bores 19. One end of the screws is provided with means, such as a kerf for rotating the screws. The end of screws 20, opposite from bores 19, are connected to a movable cell 22, in a manner which allows the screws to rotate. This cell is made of nonconducting material, however, it could be made of metal by providing the proper insulation. This connection is of the type which incorporates a threadless section of the screw, that is smaller than apertures 24, coupled with an enlarged head which will not pass thru apertures 24. Hence, rotation of screws 20 will move device 7.

This cell arrangement serves to mount a crystal 26, of the piezo-electric type, or a magnetostrictive element, which is designed to produce a voltage when a force is applied against the crystal or element.

The crystal is designed so that voltage is negative when the force is applied toward the crystal's center of rotation and positive when applied in a direction from the crystal's center of rotation to the crystal. The crystal could be divided into two sections, which would produce the desired voltages under the above conditions. The crystal used for explanation is designed with a resonant frequency corresponding to the revolutions-per-minute of the motor, and so that a force of 1 g on the crystal will produce approximately 1 volt. However, it should be understood that there may be times when it will be desirable to make the crystal so that it does not have a resonant frequency corresponding to the revolutions-per-minute of the motor in order to obtain certain advantages. It should also be understood that the ratio of the crystal's output voltage to the force applied to the crystal (shown as 1 to 1 in FIGURES 5 thru 12) is a matter of choice and can be changed by changing the characteristics of the crystal. This voltage is picked up by a pair of plates 28, which are disposed on opposite sides of the crystal. One of the plates abuts cell 22 and the other plate is connected between a weight 30, which is made of nonconducting material and does not touch any other part of the device.

Plates 28 are electrically connected to conductors 8, which extend thru apertures 18 for electrical connection to contacts 10. These contacts coact with a second pair of contacts 12 to form a pair of slip ring and brush connectors which transfer the voltage from plates 28 thru conductors 32 to signal analyzers 14. Under certain conditions, it may be desirable to use other types of pick-off means, such as the inductive type, or photo-electric type, for reducing the noise level.

In order to insure that the above combination of elements is balanced, disc 6 is provided with an eccentric balancing ring 34. This ring is connected to the disc by a set screw 36 which extends thru a slot 38 disposed in ring 34. The periphery of the disc is provided with a plurality of threaded bores 40 for positioning the ring when adjusting disc 6.

When it is desired to use the accelerometer where temperature and/or atmospheric pressure is a factor affecting the operation, the device may be hermetically sealed.

Figure 5:
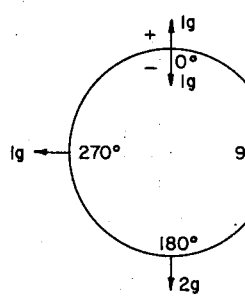
FIGURE 5 is a diagram showing the force exerted on the accelerometer's crystal, without any acceleration being applied to the vehicle, during a 360° rotation of the crystal in a vertical plane.
Figure 6:
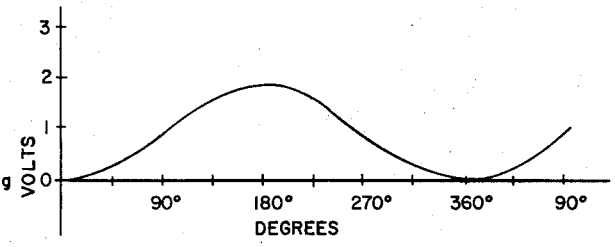
FIGURE 6 is a graphic illustration of the curve, commonly called the signature curve of the accelerometer, obtained from a voltage created by force on the crystal of the accelerometer in FIGURE 5. This curve is produced due to the accelerometer being rotated.

With the device assembled, it is calibrated so that the force exerted by the weight on the crystal is 1 g (or equal to the force of gravity). To obtain this force, the position of the radial force sensitive device is adjusted, by rotating screws 20 until rotation of disc 6 causes a force of 1 g to be produced, by weight 30, on the crystal. When the adjustment is finished, the adjusting ring 34 is varied until the complete assembly is adjusted. With this adjustment of the position of the crystal completed the force created, due to rotation of the accelerometer, on the crystal is equal to the force of gravity. FIGURE 5 represents the force on the rotating crystal at different angles. The wave form representing the force on the crystal without accelerating the vehicle is shown in FIGURE 6 and is considered the signature wave, or curve of the accelerometer.

The operation of the device is as follows:

The adjusted accelerometer is mounted in a vehicle, so that the accelerometer is referenced to the gravitational force of the earth (this is a position where the force of gravity will be applied against the force sensitive portion of the crystal).

The accelerometer's electrical contacts are connected to signal analyzer 14, which can be either located in the vehicle or away from the vehicle. Motor 3 is operated, thereby rotating disc 6. This rotation of disc 6 creates a force on crystal 26, that produces a voltage which is fed to analyzer 14 for storage as a reference voltage. From this voltage, the analyzer produces the signature curve, referred to above and shown in FIGURE 6. This signature curve can also be obtained before the accelerometer is mounted in the vehicle and stored in the analyzer. It represents the force created by the force of gravity and the centrifugal force when the crystal is rotating. With this wave in the analyzer assume that a 3 g upward acceleration is applied to the vehicle (FIGURES 7 and 8).

Figure 7:
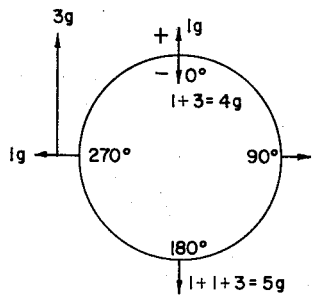
FIGURE 7 is a diagram showing the effect of a 3 g upward acceleration of the vehicle in which the accelerometer in FIGURE 5 is mounted.
Figure 8:
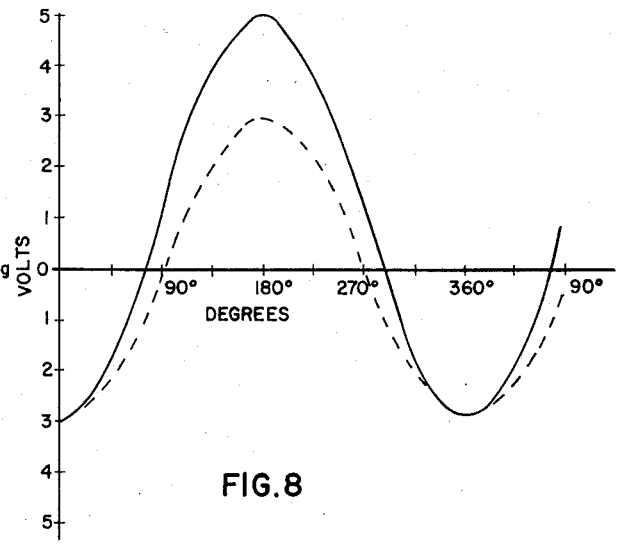
FIGURE 8 is a graphic illustration showing the curve created by this additional 3 g's of acceleration, in solid line, and the true acceleration curve, obtained by subtracting the curve obtained in FIGURE 6 from the curve created with the additional 3 g's of acceleration, represented by a dotted line.
Figure 3:
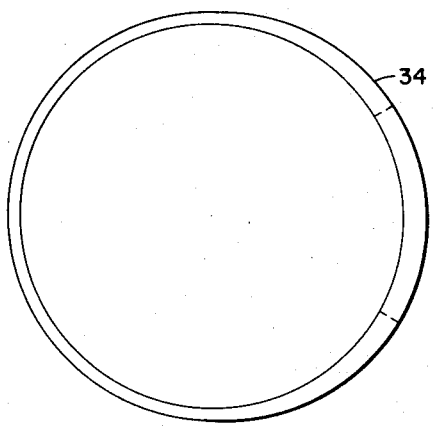
FIGURE 3 is an elevational view of the balancing ring shown in FIGURE 1.
Figure 4:
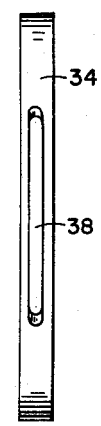
FIGURE 4 is a side view of FIGURE 3.

As illustrated by FIGURES 7 and 8, the force with the crystal at 0° and 360° is 3 g downward, 1 g force of gravity plus the 3 g acceleration force minus the 1 g centrifugal force and since this is created by a force toward the crystal's center of rotation it creates a negative voltage. Since the crystal is designed to sense force on two sides, we see that only the 1 g centrifugal force is present at 90° and 270°. At 180° we have a force of 5 g creating a positive voltage (the force is in a direction away from the crystal's center of rotation) represented by 1 g gravity, 1 g centrifugal force and 3 g from acceleration of the vehicle. The wave obtained from these voltages is shown as a solid line in FIGURE 8 and the corrected wave (shown dotted in FIGURE 8) is the result obtained when the signature wave is subtracted from the wave shown in solid. If we consider the corrected wave, we see it shows that both the amount and direction of acceleration is present in the corrected wave. For example, the amplitude of the wave is a measure of the magnitude of the acceleration and the phase location is a measure of the direction of the acceleration. In other words, the phase shifts as the direction of acceleration shifts and with the position of maximum amplitude indicating the direction of the force. This information can also be obtained as a function of the change in the sign of the voltage (from the crystal) since the amplitude is always 90° from the point where the sign of the voltage changes. It will be seen from the above discussion that we always have the earth's gravitational force vector as a reference to orient the direction of acceleration.

As long as the vehicle is accelerated vertically, the direction and amount of acceleration is obtained by the subtraction method explained above. At this point it should be understood that the signal analyzer analyzes these signals regardless of the vehicle's path and provides the corrected wave form which represents the amount and direction of acceleration.

Figure 9:
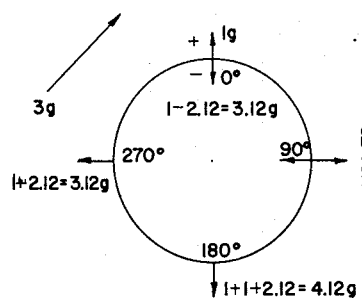
FIGURE 9 is a diagram showing the effect of a 3 g acceleration, in a direction that is upward to the right, of the vehicle in which the accelerometer in FIGURE 5 is mounted.
Figure 10:
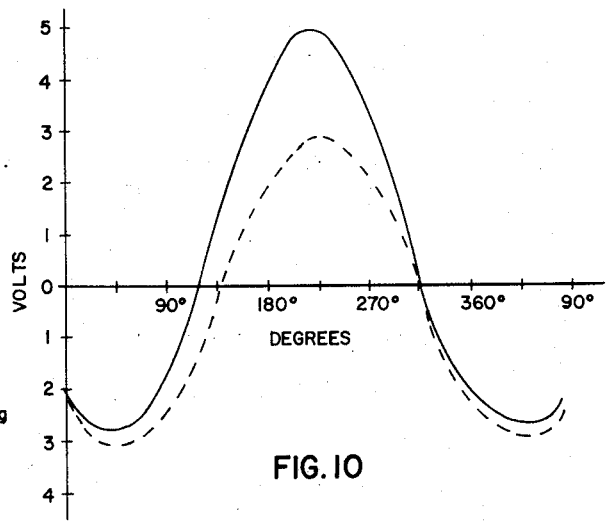
FIGURE 10 is a graphic illustration of the curve created by the forces in FIGURE 9.
Figure 11:
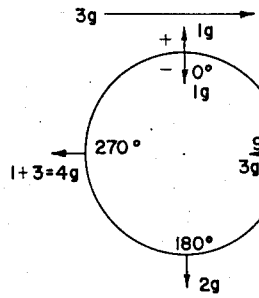
FIGURE 11 is a diagram showing the effect of a 3 g acceleration, in a direction to the right, of the vehicle in which the accelerometer in FIGURE 5 is mounted.
Figure 12:
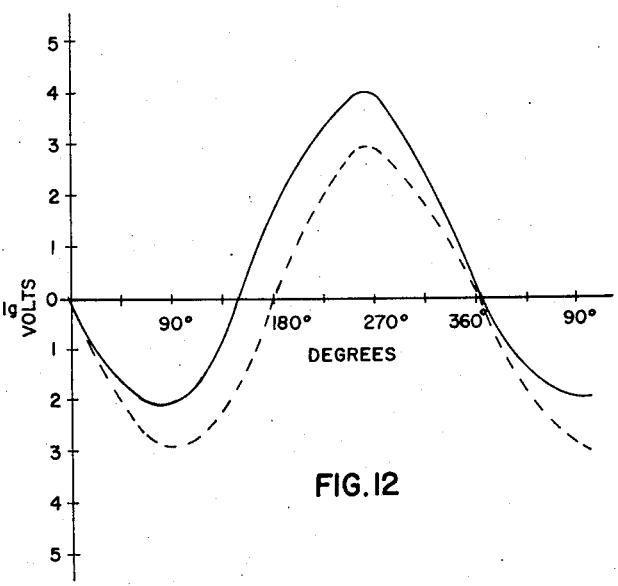
FIGURE 12 is a graphic illustration of the curve created by the forces in FIGURE 11.

FIGURES 7 thru 12 show the wave forms obtained when the vehicle is accelerated at a rate of 3 g's over a path which is vertical to horizontal. In FIGURES 9 and 10 it should be noted that the wave shows the vehicle following a path upward at an angle to the right and FIGURES 11 and 12 show the vehicle traveling to the right. It should be noted that in the analyzer, the 3 g acceleration, in FIGURES 9 and 10, appears as 3 g sine 45° and the gravity force as 1 g sine 45° in arriving at the curve shown by the solid line. The wave shown in dotted line is arrived at by the subtraction method described above. The voltage values for the curves shown in FIGURES 10 and 12 are obtained in the same manner as in FIGURES 6 and 8 and also result from force on the crystal, which produces a voltage that is supplied to the analyzer.

It is to be understood that the form of the invention that is herein shown and described is the preferred embodiment, and that various changes in the shape, size and arrangement of parts may be resorted to without departing from the spirit of the invention, or the scope of the subjoined claims.

What is claimed is:

1. An accelerometer comprising a motor having an externally extending output shaft rotatable at a given constant rate; a dynamically balanced disc, having a hollow portion therein, secured to said shaft for rotation therewith; a force sensitive device mounted in said hollow portion and disposed for rotation with said disc to generate a reference voltage containing the earth's gravitational force vector as a reference, said device disposed to generate a second voltage responsive to accelerations; means for varying the position of said force sensitive device relative to its axis of rotation for generation of said reference voltage; a signal analyzer electrically connected to said device for comparing said second voltage with said reference voltage, thereby deriving a voltage proportionate to the amount and direction of said accelerations.

2. A device as set forth in claim 1, in which said disc comprises a removable access plate and a pair of diametrically opposed threaded bores communicating into said hollow portion; an insulating member disposed in surrounding relation with said force sensitive device; screw members threadably disposed in said bores in engaging relation with said insulating member for movement thereof to radially position said force sensitive device at a determined distance from the axis of rotation of said device.

3. A device as set forth in claim 1, in which said force sensitive device comprises a movable cell, means connected to said cell for moving said cell, and a force sensitive element having two surfaces capable of producing voltages when subjected to forces.

4. A device as set forth in claim 1, which further comprises an eccentric ring secured to said disc and disposed for adjustment along the axis of said disc for dynamic balance of said disc.

5. A device as set forth in claim 3, in which said sensitive element is a piezo-electric crystal.

6. A device as set forth in claim 3, in which said sensitive element is sensitive only to radial forces.

7. The accelerometer of claim 1 wherein there is provided means for the electrical connection of the accelerometer and said analyzer, said means including a pair of conducting plates mounted on opposite sides of said force sensitive device; a pair of conductors electrically connected to said plates, said conductors disposed in an aperture communicating between said hollow portion and the periphery of said disc; a stationary contact having said conductors secured thereto and positioned adjacent the periphery of said disc; a second contact positioned adjacent said stationary contact for electrical coaction therewith, said second contact electrically connected to said signal analyzer to transmit thereto the voltages received from said force sensing device.

8. A device as set forth in claim 7, in which said pair of conducting plates are separated by said sensitive element.

9. A device as set forth in claim 8, in which one of said plates is abutted by a weight.

References Cited in the file of this patent

UNITED STATES PATENTS

| | | |
|---|---|---|
| 2,638,556 | Hausz | May 12, 1953 |
| 2,726,074 | Ketchledge | Dec. 6, 1955 |
| 2,928,667 | Peterson | Mar. 15, 1960 |